US008094062B2

(12) United States Patent
Höök

(10) Patent No.: US 8,094,062 B2
(45) Date of Patent: Jan. 10, 2012

(54) FORE/AFT LOOKING AIRBORNE RADAR

(75) Inventor: Anders Höök, Hindås (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 318 days.

(21) Appl. No.: 12/517,423

(22) PCT Filed: Dec. 18, 2006

(86) PCT No.: PCT/SE2006/050589

§ 371 (c)(1),
(2), (4) Date: Jun. 3, 2009

(87) PCT Pub. No.: WO2008/076020

PCT Pub. Date: Jun. 26, 2008

(65) Prior Publication Data

US 2010/0090881 A1 Apr. 15, 2010

(51) Int. Cl.
*G01S 7/02* (2006.01)
*H01Q 21/00* (2006.01)
*H01Q 1/28* (2006.01)

(52) U.S. Cl. ..... 342/175; 342/368; 244/1 R; 244/117 R; 244/129.1; 343/700 R; 343/705

(58) Field of Classification Search .................... 342/29, 342/82, 89, 175, 73–81, 368–377, 22, 41, 342/147, 158, 159; 343/700 R, 703, 705–708, 343/872, 873; 244/1 R, 129.1
See application file for complete search history.

(56) References Cited

U.S. PATENT DOCUMENTS 1,874,935 A * 8/1932 Drake et al. .................. 343/705
2,136,532 A * 11/1938 West ............................. 343/705
2,235,015 A * 3/1941 Eggers .......................... 343/705
2,368,298 A * 1/1945 Harris ........................... 343/872
2,376,393 A * 5/1945 Sheridan ........................ 343/705
2,555,857 A * 6/1951 Nelson et al. ................. 343/705
2,617,934 A * 11/1952 McMillan et al. ............ 343/705
2,712,603 A * 7/1955 Bridges et al. ................ 343/705
2,929,581 A * 3/1960 Johnson, Jr. .................. 343/706
2,949,606 A * 8/1960 Dorne ........................... 343/708
2,980,909 A * 4/1961 Clanton, Jr. et al. .......... 343/705
2,980,910 A * 4/1961 Fourcade ...................... 343/705
3,026,516 A * 3/1962 Davis ............................ 343/705
3,039,095 A * 6/1962 Josephson ..................... 343/708
3,045,236 A * 7/1962 Colman et al. ................ 343/705
3,071,767 A * 1/1963 Freedman ....................... 342/41
3,086,204 A * 4/1963 Alford .......................... 343/708
3,101,469 A * 8/1963 Varian ........................... 342/159
3,210,764 A * 10/1965 Anderson et al. ............. 343/708
3,220,006 A * 11/1965 Young et al. .................. 343/708
3,283,327 A * 11/1966 Stuckey, Jr. et al. .......... 343/705
3,390,393 A * 6/1968 Upton ........................... 343/708
3,404,396 A * 10/1968 Buchler et al. ................ 343/708
3,613,098 A * 10/1971 Blasko .......................... 343/708
3,737,906 A * 6/1973 Maynard ....................... 343/705
4,072,952 A * 2/1978 Demko ......................... 343/708
(Continued)

*Primary Examiner* — Bernarr Gregory

(57) ABSTRACT

An antenna system for an airborne radar system with a dorsal unit having two opposing long sides extending in a height direction (Z) and a longitudinal direction (X), and two opposing short sides extending in a lateral direction (Y) and the height direction (Z), and an upper side opposing a bottom side each extending in the longitudinal direction (X) and the lateral direction (Y). The antenna system comprises antenna devices being interspaced and mounted in connection to one of the short sides or both the short sides and extending in the height direction (Z). Each of the antenna devices comprises a waveguide board.

24 Claims, 8 Drawing Sheets

U.S. PATENT DOCUMENTS 4,129,866 A * 12/1978 Turco ............................ 342/158
4,662,588 A * 5/1987 Henderson .................... 343/708
4,716,417 A * 12/1987 Grumet ......................... 343/708
5,049,891 A * 9/1991 Ettinger et al. ............... 343/705
5,097,267 A * 3/1992 Raviv ............................ 342/368
5,132,693 A * 7/1992 Werp ............................ 343/705
5,405,107 A * 4/1995 Bruno ........................... 343/705
6,052,078 A * 4/2000 Waterman ..................... 343/705
7,274,336 B2 * 9/2007 Carson .......................... 343/705
7,295,165 B2 * 11/2007 Ferguson et al. ............. 343/705
7,528,763 B2 * 5/2009 Rowe et al. ..................... 342/22
2006/0279451 A1 * 12/2006 Rowe et al. ..................... 342/22

* cited by examiner

FORE/AFT LOOKING AIRBORNE RADAR

TECHNICAL FIELD

The present invention refers to an antenna system for an airborne radar system. The antenna system comprises a dorsal unit having two opposing long sides extending in a height direction and a longitudinal direction, and two opposing short sides extending in a lateral direction and the height direction, and an upper side opposing a bottom side each extending in the longitudinal direction and the lateral direction. The antenna system comprises antenna devices.

BACKGROUND

In the field of radar devices for airplanes it is known to use a dorsal unit positioned on the airplane body and extending in the longitudinal direction of the airplane, i.e. in the direction from the fore to the aft. The dorsal unit comprises a number of side looking antenna elements positioned along the longitudinal direction of the dorsal unit for side looking purposes. One problem with the dorsal arrangement is that the radar cannot see in a forward or rearward direction without additional antenna elements being placed in the front and the rear of the dorsal unit.

The prior art document U.S. Pat. No. 5,923,302 concerns an endfire array with monopoles on the roof of the dorsal unit. Problems with this solution are that it is limited in terms of antenna performance, expensive in terms of a complicated electromagnetic design process, an intricate scan control and complicated manufacturing. Furthermore, the solution results in an undesirable upwards lobe tilt unless the ground plane is bent downwards towards the ends of the dorsal unit.

In prior art is also known to use a separate antenna in the nose of the aircraft for forward looking and an antenna inside a bulbous radome somewhere at the aft for rearward looking. The solution to equip these antennas with extra radar systems has the disadvantage of being costly.

Alternatively, a disadvantage with the forward and rearward looking antennas connected to a common radar is that long high-power RF feeds must be drawn from the radar to the forward/rearward looking antennas. This solution becomes unnecessarily heavy and it blocks the possibility to install other, important sensors in the nose radome. Therefore, a lightweight solution that utilizes the power delivered by the existing T/R-units is to be preferred.

There is thus a need for an antenna solution in a radar system providing full coverage (360°) with no moving parts, minimized drag, minimized weight, minimized system size, low cost, high gain and an electronic scan capability, and an overall improvement of the performance of the antenna system in a radar system with regard to forward and/or rearward looking abilities.

SUMMARY

The present invention refers to an antenna system for a radar system for an airplane. The antenna system comprises a dorsal unit extending in a longitudinal direction, a lateral direction and a height direction. The dorsal unit comprises two opposing long sides extending in a height direction and a longitudinal direction, and two opposing short sides extending in a lateral direction and the height direction, and an upper side opposing a bottom side each extending in the longitudinal direction and the lateral direction. The longitudinal direction coincides essentially with the longitudinal direction of the airplane when the dorsal unit is mounted onto the airplane.

The dorsal unit for a side looking radar system comprises a number of first antenna elements positioned on each of the long sides of the dorsal unit and in the longitudinal direction of the dorsal unit. The antenna system comprises a microwave power distribution system comprising a number of first transmit-receive units (hereinafter called T/R-units) positioned inside the dorsal unit and arranged to feed microwave power to and from the first antenna elements. The power distribution system arranged to distribute microwave power.

The present invention is characterized in that the antenna system comprises an assembly of interspaced antenna devices mounted in connection to one of the short sides or both the short sides and extending in the height direction, wherein each of the antenna devices comprises a waveguide board. By covering, and preferably extending the front and/or aft projection of the dorsal unit with a number of planar waveguide boards a beneficial high antenna performance is achieved without introducing excessive aerodynamic drag. The waveguide boards have an extension essentially in the height direction and may extend vertically or may extend at an angle to a vertically extending line or plane. The antenna devices are preferably separated by a distance determined by the requirement that the forward and rearward looking antennas are able to scan in the forward and rearward sectors in such a way that grating lobes do not occur.

Another advantage is that the antenna system may be designed in such a way that the antenna devices may be fed microwave energy by use of the first T/R-units already comprised in the dorsal unit. The antenna devices may thus transmit the entire power produced by all first T/R modules along the dorsal unit for utilizing all microwave power for a horizontal scan in the fore and/or aft direction. Hence, the solution does not require extra T/R modules why the assembly of antenna devices can be mounted onto an already existing dorsal unit without a major re-design of the dorsal unit.

The waveguide board also comprises second antenna elements coupled to second waveguides comprised in the waveguide board and arranged to distribute the power to/from at least one summation point to the second antenna elements.

The first T/R-units are controlled by a control unit in such a way that the waveguide boards are fed microwave energy independently of the other waveguide boards for control of phases and amplitudes between different antenna devices.

In one embodiment of the invention each antenna device comprises an aerodynamic housing encasing the waveguide board. One advantage of using an aerodynamic housing is that fore and/or aft scanning can be achieved according to above with a minimum increase of aerodynamic drag.

The housing may comprise a foam-like material surrounding the waveguide board. The foam-like material should be form stable high speed conditions and should at the same time be lightweight. The material is advantageously hard, withstands mechanical stress, is lightweight, has low electrical losses, and has advantageously a relative electric permittivity close to one.

The use of a foam-like material gives the advantage of a low-cost and lightweight antenna device with high aerodynamic performance without adding much weight to the dorsal unit weight.

The housing may comprise a surface layer encasing the foam-like material for environment protection. The surface layer may comprise a metallic skin providing a ground plane for achieving an enhanced directivity, wherein the surface layer comprises slots in the height direction, i.e. in the vertical direction.

The antenna device may also comprise an RF-transparent housing surrounding the waveguide board. The second antenna element is comprised within the housing and protruding from the waveguide board in the longitudinal direction for directivity purposes. Here "longitudinal" refers to a direction coinciding with the longitudinal direction when the dorsal unit is mounted onto an airplane. The second antenna element may also comprise a passive or active structure.

The antenna system may comprise a support structure for attachment of the antenna devices to the dorsal unit and for keeping the antenna devices in position relative the dorsal unit. The support structure may comprise third waveguides for feeding microwave power to the waveguide boards via a connector.

In one embodiment the microwave power distribution system may advantageously comprise an assembly of polarized first waveguides mounted on top and/or on the bottom of the dorsal unit and/or inside the dorsal unit. The antenna devices are connected to the first waveguides so that the microwave power supplied by the first PR-units can be distributed in such a way that an azimuthal scan can be performed by the radar system in the forward and/or the rearward sectors. The scan is made by controlling the phases of the microwave power between the antenna elements by controlling the first T/R-units in a manner known from prior art. The purpose of the invention is thus to allow scanning of a fore and/or aft lobe without using an antenna in the nose of the airplane and a radome at the tail of the same, or to use the also less satisfactory solution of the above described end fire solution described in U.S. Pat. No. 5,923,302.

One benefit of the embodiment is that the first waveguide assembly can be designed and manufactured at a low cost. Further advantages are that it is less expensive and more lightweight than the nose and/or aft antenna known from prior art. A further advantage with the first waveguides is that the integration into the aircraft becomes simpler to perform.

Furthermore, the following advantages are shared with the antenna system described in U.S. Pat. No. 5,923,302, namely, that the weight does not add significantly to the dorsal unit weight, and that the first waveguide assembly can be mounted onto the dorsal unit without major re-design of an existing dorsal unit. Yet furthermore, since the first waveguides extend essentially over the entire length of the dorsal unit, the first waveguides may be used for feeding energy to both the fore and aft antenna elements. Still furthermore, the first waveguides and the antenna devices form a collection of parts that may easily be mounted in situ directly onto the existing dorsal unit and interconnected to each other and connected to the already existing devices, for example the first T/R-units. The first T/R-units may be coupled to the first waveguides by connecting all first T/R-units to a dedicated first waveguide and to equip adjacent first waveguides with apertures for allowing the electromagnetic signal in the dedicated first waveguide to the remaining first waveguides. In an alternative embodiment one T/R-unit is coupled to one first waveguide and the number of first waveguides and T/R-units are the same. In a yet further embodiment, a few T/R-units, say $N_{T/R}$ are coupled to each of the $N_{FWG}$ first waveguides so that. $N_{T/R}$ multiplied with $N_{FWG}$ approximately equals $N_{T/R,TOT}$. Since $N_{FWG}$ is equal to $N_{AD}$, the number of antenna devices, this approximate relation could also be expressed as: $N_{T/R}=N_{T/R,TOT}/N_{AD}$).

However, the present invention has the following advantages over the device described in U.S. Pat. No. 5,923,302; it is inexpensive in terms of the electromagnetic design process, it does not need an intricate scan control, and does not need complicated manufacturing. Furthermore, the present invention does not result in an undesirable upwards lobe tilt. Yet furthermore, the present invention may be designed for a better and more controllable antenna performance in terms of lobe widths and scannability.

The assembly may have a planar extension in the lateral direction but may also have a somewhat dome shaped or curved cross-section, but may also be arranged in a staggered manner, i.e. in a zigzag pattern where a number of first waveguides being partly or fully on top of other first waveguides.

In one embodiment the second antenna elements are connected to second T/R-units being arranged to be controlled in such a way that the microwave power supplied by the first T/R-units can be distributed by the antenna system in such a way that an elevation scan is performed by the radar system in a direction out from one of the short sides or both the short sides, i.e. in the forward direction and/or the aft direction of an airplane when the dorsal unit is mounted onto the airplane.

The antenna system according to the invention may thus be used for a 360° azimuthal scan in a plane described by the lateral direction and the longitudinal direction by use of a control unit for controlling the first T/R-units to feed microwave energy to the first antenna elements and the second antenna elements respectively with a phase increment in the plane. The first T/R-units may thus comprise a switch device controlled by the control unit for controlling the feed of microwave energy to the first antenna elements or to the second antenna elements depending on the direction of the scan. The first antenna elements are used for essentially a lateral scan on both sides of the dorsal unit and the second antenna elements are used for forward and rearward scan. The antenna system may also perform an elevation scan by controlling the second T/R-units to feed microwave energy to the second antenna elements with a phase increment in the height direction.

The stated advantages and embodiments will become apparent in the detailed description of the invention below.

BRIEF DESCRIPTION OF THE DRAWINGS

The present invention will become more fully understood from the detailed description given herein below in the accompanying drawings which are given by way of illustration only, and thus are not limited to the present invention and wherein:

FIG. 8*a* schematically shows a front view of an antenna system according to the invention comprising a radome, and wherein;

DETAILED DESCRIPTION

Figure 1:
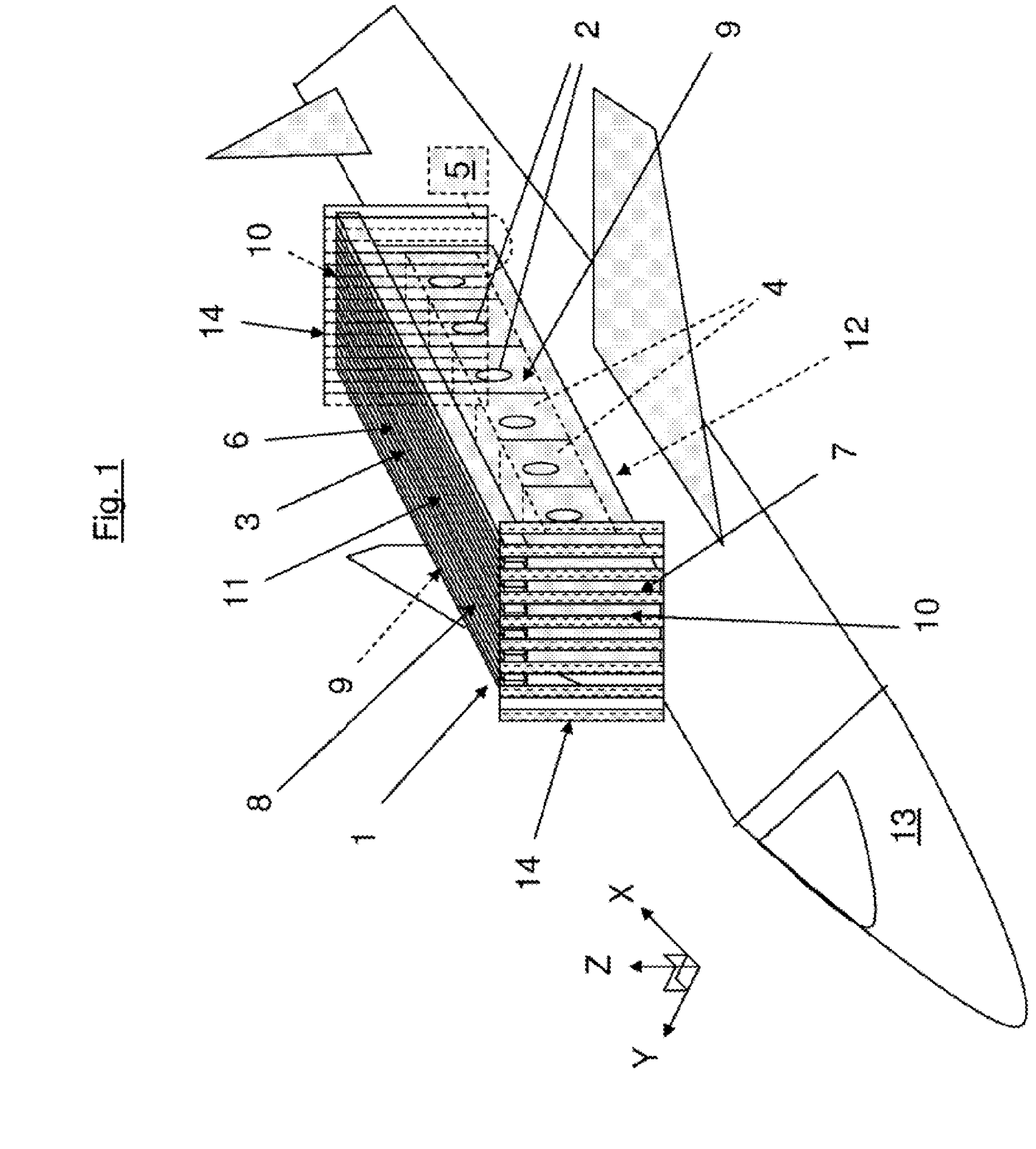
FIG. 1 schematically shows an embodiment of a microwave power distribution system in an antenna system according to the invention for an airborne radar system.

FIG. 1 schematically shows an antenna system 1 for an airborne radar system according to the invention. The antenna system 1 comprises a number of first antenna elements 2 and a microwave power distribution system 3 comprising a number of first T/R-units 4 arranged to distribute microwave power to and from a microwave receiver and generator 5 to the first antenna elements 2. FIG. 1 schematically teaches an advantageous embodiment of the microwave power distribution system 3. In FIG. 1 the power distribution system 3 comprises a planar assembly of polarized first waveguides 6 coupled to a number of second antenna elements 7 directed at an angle essentially perpendicular to the number of first antenna elements 2. The first T/R-units 4 are arranged for distribution of microwave energy to the first and second antenna elements 2, 7.

The antenna system comprises a dorsal unit 8 having two opposing long sides 9 extending in a height direction Z and a longitudinal direction X, and two opposing short sides 10 extending in a lateral direction Y and the height direction Z, and an upper side 11 opposing a bottom side 12 each extending in the longitudinal direction X and the lateral direction Y. The directions X, Y and Z are only mentioned in order to facilitate the description and understanding of the invention and are in FIG. 1 depicted as an orthogonal system. It should be noted that the dorsal unit does not have to be a rectangular box, but may comprise sides having a non-planar extension. For example, the upper side 11 may have a somewhat dome shaped or curved cross-section taken in the lateral direction. The first waveguides 6 may then follow the shape of the upper side 11 or may be arranged with a different contour.

In FIG. 1 the assembly of polarized first waveguides 6 is mounted on top of the dorsal unit 8, i.e. on the upper side 11 of the dorsal unit 8. The assembly of first waveguides 6 may alternatively be positioned at the bottom side 12 of the dorsal unit 8 or within the dorsal unit 8. In FIG. 1 the dorsal unit 8 is mounted onto the top of an airplane 13 so that the longitudinal direction of the airplane 13 coincides with the longitudinal direction of the dorsal unit. The airplane 13 is left out in the remaining drawings in order to minimize the number of features in the drawings. However, the dorsal unit 8 is intended to be mounted onto a device moving at high speed, preferably in the air. The high speed feature is of importance since it puts high demands on the antenna system with regard to aerodynamical features such as aerodynamic drag as well as elevated temperatures and wear due to, for example, rain and sand erosion.

In FIG. 1 the first antenna elements 2 are positioned at least longitudinally on each of the long sides 9 of the dorsal unit 8 and the second antenna elements 7 are positioned in connection to one of the short sides 10 or both the short sides 10. FIG. 1 shows antenna devices 14 according to the invention mounted onto both the short sides 10 of the dorsal unit 8. The antenna devices 14 comprise the second antenna elements 7 which are connected to the first, waveguides 6. The antenna devices 14 will be described further below.

In FIG. 1 the first T/R-units 4 are positioned within the dorsal unit 8, but they may be positioned at a location outside the dorsal unit 8, for example inside the airplane 13. The first T/R-units 4 are often referred to as T/R-modules and they serve the purpose of feeding RF signals from the microwave generator 5 to the antenna elements 2, 7 during a transmission period, and receiving RF signals from the antenna elements 2, 7 while switching off the energy feed during a receiving period. During a first transmission period the first T/R-units 4 feed energy from the power source to the first antenna elements 2 via for example a galvanic coupling or by use of a contact-less electromagnetic coupling. During a second transmission period the first T/R-units 4 feed energy from the power source to the second antenna elements 7 via the first waveguides 6. The energy fed from the first T/R-units 4 to the first waveguides 6 may be done by any suitable means, for example by use of a galvanic conductor, i.e. a flexible cable or the like, connecting a T/R-unit 4 with a transition device for transforming the electrical signal into an electromagnetic microwave signal. The microwave signal is fed by the transition device into the first waveguides where the microwave signal propagates in a known manner. The energy from the T/R-units 4 may also be fed to the first waveguides by means of a contact-less electromagnetic coupling.

During the receiving period the antenna elements 2, 7 receive returning electromagnetic power previously sent out having been reflected from an object, for example a target. During the listening period the microwave power distribution system 3 comprises means for feeding the returning microwave energy to receivers for signal processing in the radar system. With regard to the second antenna elements 7, the first waveguides 6 are constructed to feed the returning microwave energy directly to the receivers or to a converting device converting the electromagnetic signal in the first waveguides 6 into an electric signal in a cable for further feeding the microwave energy to the receivers.

In FIG. 1, the distribution system 3 comprises an assembly of horizontally polarizing rectangular first waveguides 6 but may be in the form of vertically polarizing first waveguides or circularly polarizing first waveguides or first waveguides polarized in any other suitable way. The first waveguides 6 are not limited to a rectangular cross-section, but may have any geometric cross-section suitable for guiding microwaves, for example circular, oval, and ridged.

Figure 2:
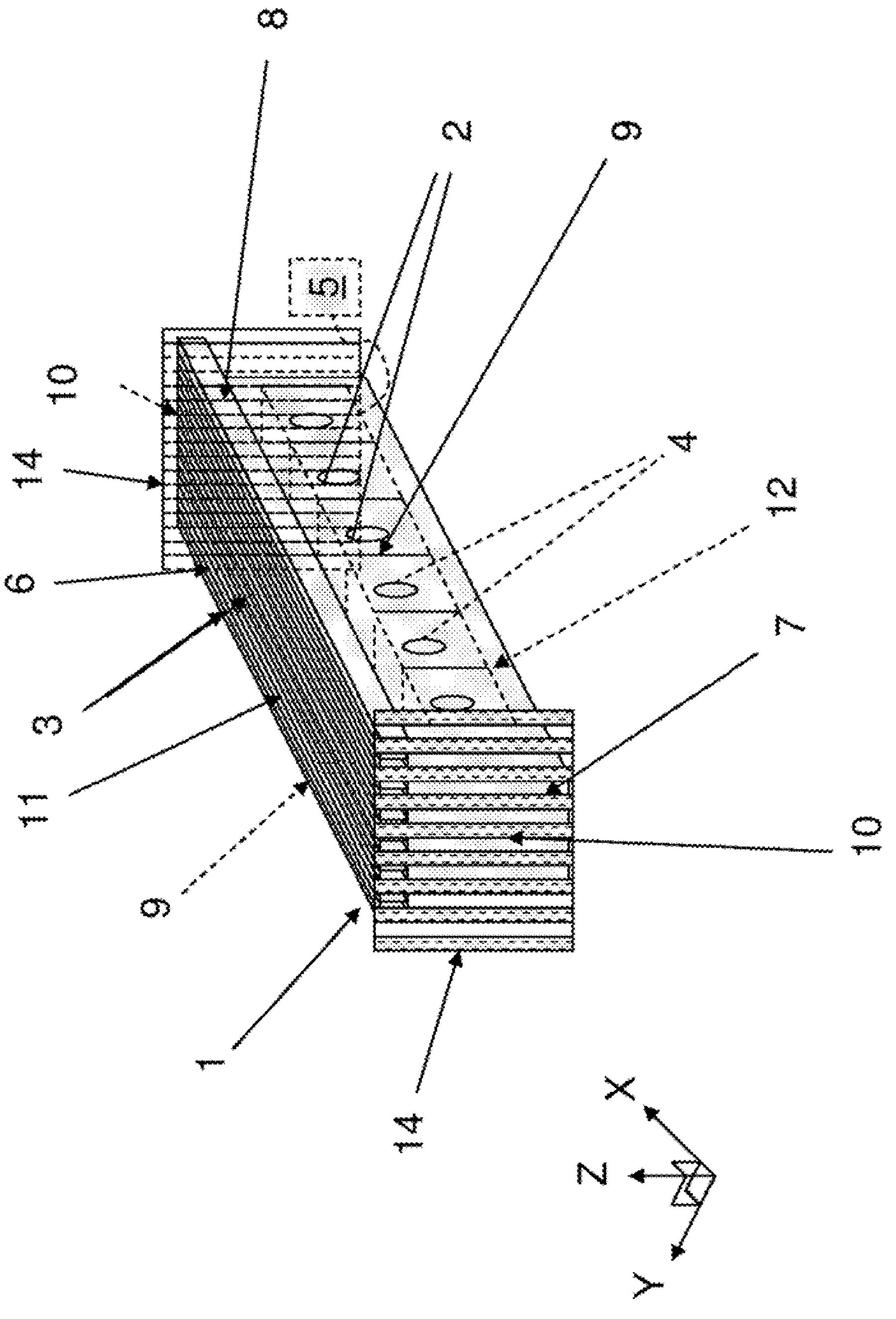
FIG. 2 schematically shows a microwave power distribution system according to the invention.

FIG. 2 schematically shows a microwave power distribution system 3 according to the invention. The first waveguides 6 in FIG. 1 are not visible in FIG. 2 and it should be noted that the invention is not restricted to the use of the first waveguides 6 in FIG. 1. Hence, the first waveguides may be replaced by any suitable means for feeding a microwave signal. However, the use of first waveguides is advantageous because of the easier assembly of the antenna system and for the lightweight construction and for the other reasons stated above.

The first waveguides 6 may each be fed the microwave signal by use of a transforming device comprising a probe being either magnetic, electric or adapted to transmit/transform energy in any other suitable way. However, a vast amount of first waveguide feeding techniques are known from prior art which may be applied on the invention.

The feeding of energy to the first waveguides 6 needs to be controlled in order to control the phase shifts in the first waveguides 6 in order to direct the energy in the front or aft direction of the airplane. Hence, the phase increment of the T/R-units needs to be set in order to have a constructive adding of energy in the desired direction. Therefore, a control device (not shown) is comprised in the antenna system for control of the first and the second antenna elements 2, 7.

According to one embodiment of the invention one dedicated first waveguide 6 may be fed microwave energy by all first T/R-units 4. The microwave power is distributed to the adjacent first waveguides 6 via apertures (not shown). The waves are distributed from the dedicated first waveguide 6*a* in the lateral direction Z towards the most peripheral first waveguides. The signal propagation is intended to be in the longitudinal direction of the first waveguide assembly, i.e. in the direction from end to end, and is utilized at the end sections only.

The dedicated first waveguide 6 may be the central first waveguide or any other first waveguide. The distribution system 3 comprises two linear assemblies of phase shift devices (not shown) arranged at each end of the first waveguide assembly 6. One phase shift device is positioned at each end of each first waveguide 6. The phase shift devices may be of any type known from prior art, for example ferrite phase shift devices. The phase shift devices may be mounted onto the end of the first waveguide 6 or may be inserted into an end part of the first waveguide 6.

The advantages of this embodiment are a highly modular and low-cost design. For instance, only one feed transition, for example the above described probe, between the first waveguide 6 assembly and each of the first T/R-units 4 needs to be designed. It does not offer the possibility of scanning of the fore/aft lobe without using a linear assembly of additional phase shifters at the first waveguide 6 ends because the phase in one first waveguide will be determined by the phases of the neighboring feed first waveguide. However, the embodiment has the advantage that the entire first waveguide assembly 6 may be manufactured separately from the dorsal unit 8 and may then easily be mounted onto an already existing dorsal unit and connected to the already existing first T/R-units 4 by simple means.

The antenna devices according to the invention allow for an azimuthal scan in the X-Y-plane. The lobes extend essentially in the forward direction X and scanning is performed in the lateral direction Y. The azimuthal scan is created by use of the second antenna elements being fed microwave power via the first waveguides 6. The azimuthal scan has been created by use of the control device for controlling the first T/R-units 4 according to above and the phase shift devices. The second antenna elements 7 are arranged to cover the forward sector, and in appropriate oases the aft sector, which cannot be scanned by the first antenna elements. The first antenna elements 2 may be used to scan a sector being 2 times an angle $\alpha$ ($2\times\alpha$) and the second antenna elements 7 may be used to scan a sector being $2\times(90°-\alpha)$. Here, the angle $\alpha$ refers to an angle between a normal extending in the lateral direction Y, i.e. in a direction being essentially perpendicular to the longitudinal direction X of the dorsal unit 8, and a tangent in the longitudinal direction X. The antenna system 1 may thus be used to scan 360° in the X-Y-plane. It can be mentioned as an example that if the first antenna elements cover a sector of 120° i.e. 2 times 60° on each side of the dorsal unit 8 and the second antenna elements cover a sector of 60°, i.e. 2 times 30° in both the fore and aft direction.

According to another embodiment the first T/R-units 4 feed all first waveguides 6. The fact that the feed points of a first waveguide must obey certain phase relationships for efficient propagation does not prohibit that the phases between the first waveguides 6 can be given arbitrary values. Hence, fore and/or aft scanning is possible without extra phase shift devices. This solution avoids the costs and weight associated with phase shift devices. However, the phases of the first T/R-units 4 have to be flexibly controlled by the control device in order to be able to control the direction of propagation of the microwave signal in the cluster of first waveguides 6. The control device therefore controls the first T/R-units 4 according to a selected algorithm giving the control of the direction of propagation.

The first waveguide assembly 6 may be manufactured separately in the same manner as the first waveguide assembly described in connection the first embodiment. One difference however between the two embodiments described above is that the latter embodiment has to have feed transitions to all first waveguides, for example by the above described probe. However, since the phase shift devices are not necessary, the embodiment also has the advantages of being of a highly modular and low-cost design.

Also in the latter embodiment the first and second antenna elements 2, 7 are positioned so that the antenna system 1 can be controlled to cover a 360° azimuthal scan by alternating between the first antenna elements 2 and the second antenna elements 7.

It should be noted that each of the first T/R-units 4 are directly coupled to the side looking first antenna elements 4 on each long side of the dorsal unit 8, but that the first T/R-units 4 are indirectly coupled to the second antenna elements 7 via the first waveguides 6. Since at least a number of the first T/R-units 4 are switched to a number of the first waveguides 6, the phases between the first T/R-units may be controlled so that the common signal from the first T/R-units are fed in the fore or aft direction in the first waveguides 6. Hence, the first T/R-switches may be controlled so that the antenna system may perform a scan on all sides of the dorsal unit 8.

Figure 3:
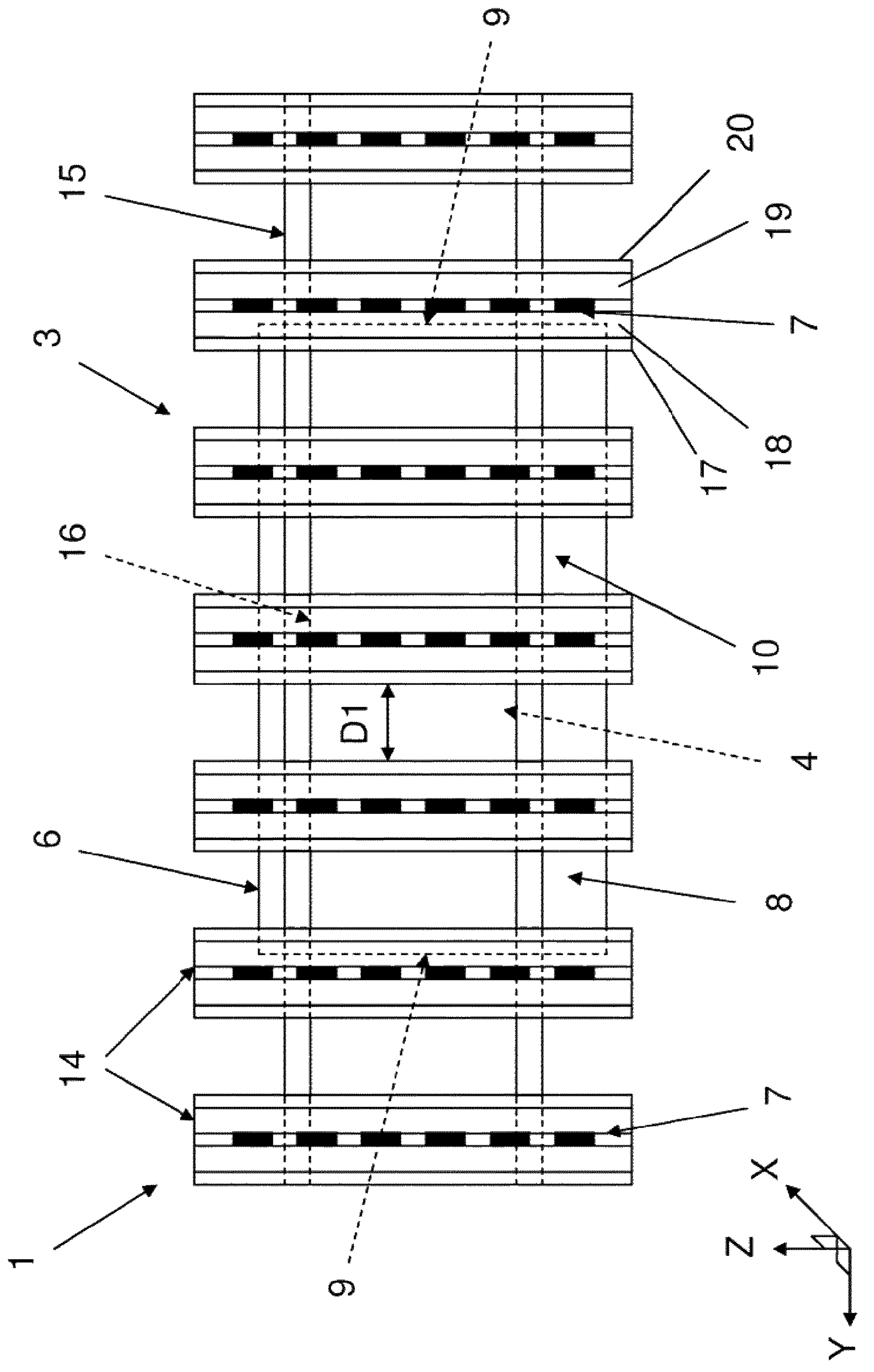
FIG. 3 schematically shows a front view of an antenna system according to the invention.

FIG. 3 schematically shows a front view of an antenna system according to the invention. The antenna system 1 comprises antenna devices 14 mounted in connection to one of the short sides 10 or both the short sides 10 and extending in the height direction Z. The antenna devices 14 are preferably positioned essentially parallel to each other with a selected distance D1 between them. The selected distance D1 may be decided dependent on the desired performance of the antenna system 1 and on minimizing the aerodynamic drag. It should be noted that it is the center-to-center distance that relates to the desired performance and that the distance D1 in relation to the center-to-center distance that relates to drag. The second antenna elements 7 are comprised in the antenna devices 14 and are preferably positioned in each of the antenna devices 14 in a row, i.e. in a series after each other in the height direction Z.

The antenna devices 14 may be mounted directly onto the short side(s) 10 or may be mounted to the dorsal unit via brackets 15. The antenna devices 14 may also be interconnected via brackets 15 such that the antenna devices form a separate unit easily mounted onto an already existing dorsal unit. The antenna devices 14 are connected to the first waveguides 6 by any known means, for example by contactless connector means or galvanic connector means. The number of antenna devices 14 is correlated to the number of first waveguides in such a way that there is one antenna device connected to each first waveguide 6. One advantage of using the antenna devices 14 is that the effective antenna aperture area is increased at the same time as the aero dynamic drag is kept to a minimum. The increased effective antenna aperture area gives the possibility of increased gain and thus the possibilities to create more narrow lobes for better detection of targets.

Furthermore, the antenna devices 14 are connected to the first waveguides 6 so that the microwave power supplied by the first T/R-units 4 can be distributed by the antenna system in such a way that an azimuthal scan according to the above is performed by the radar system in a direction out from one of the short sides 10 or both the short sides 10, i.e. in the forward direction and/or the aft direction of an airplane when the dorsal unit is mounted onto an airplane.

In a further embodiment the second antenna elements 7 are connected to second PR-units 16 positioned between the first waveguides 6 and the second antenna elements 7. The second T/R-units 16 are arranged to be controlled by the control unit. The microwave power supplied by the first T/R units 4 is fed to the second T/R-units 16 via the first waveguides 6. The second T/R-units 16 are controlled by the control unit in such a way that the phase increment between the second antenna elements 7 gives an elevation scan in a direction out from one or both the short sides 10, i.e. in the forward direction and/or the rearward direction of an airplane when the dorsal unit is mounted onto an airplane. The antenna system 1 may thus use the first T/R-units 4 for an azimuthal scan and the second T/R-units for an elevation scan.

The above described scans are made by controlling phases in different antenna elements by the control of the first and/or the second T/R-units 16 in a manner known from prior art and will not be explained further.

The antenna devices 14 may be realized in a number of different ways. For example, each antenna device 14 comprises a layered structure comprising in the lateral direction an electrically conducting layer 17 onto a non-conducting 18 layer positioned adjacent a number of second antenna elements 7 and on the other side of the antenna elements 7 a second non-conducting layer 19 covered with a conductive layer 20. The size of the antenna devices 14 is dependent on the intended use of the antenna system, i.e. the intended use of the radar system that comprises the antenna system.

Below is an example of an antenna device suitable for an airborne S-band radar: The measurements are 10 mm times 100 mm times the height which may be less than, equal to or greater than the height of the dorsal unit. The antenna devices are separated by a selected distance D1=70-80 mm depending on a number of parameters, for example the wavelength of the microwave transmitted. The separation therefore has to be calculated with regard to these parameters.

The antenna devices 14 form an assembly of antenna devices 4 forming an antenna. One benefit of using such thin antenna devices 14 in the proposed manner is that the antenna may extend outside the dorsal unit in the lateral direction without significant increase of aerodynamic drag. The possibility to extend the cross-section of the antenna system in the forward and/or aft direction is a major benefit of the invention since the more antenna devices and the wider the antenna system is in the lateral direction, the narrower can the lobe be formed.

Further advantages of the invention are that the dorsal fin antenna assembly is thin, light and requires no moving parts, and thus advantageously replaces the previously known AWACS rotodome type antenna.

Figure 4:
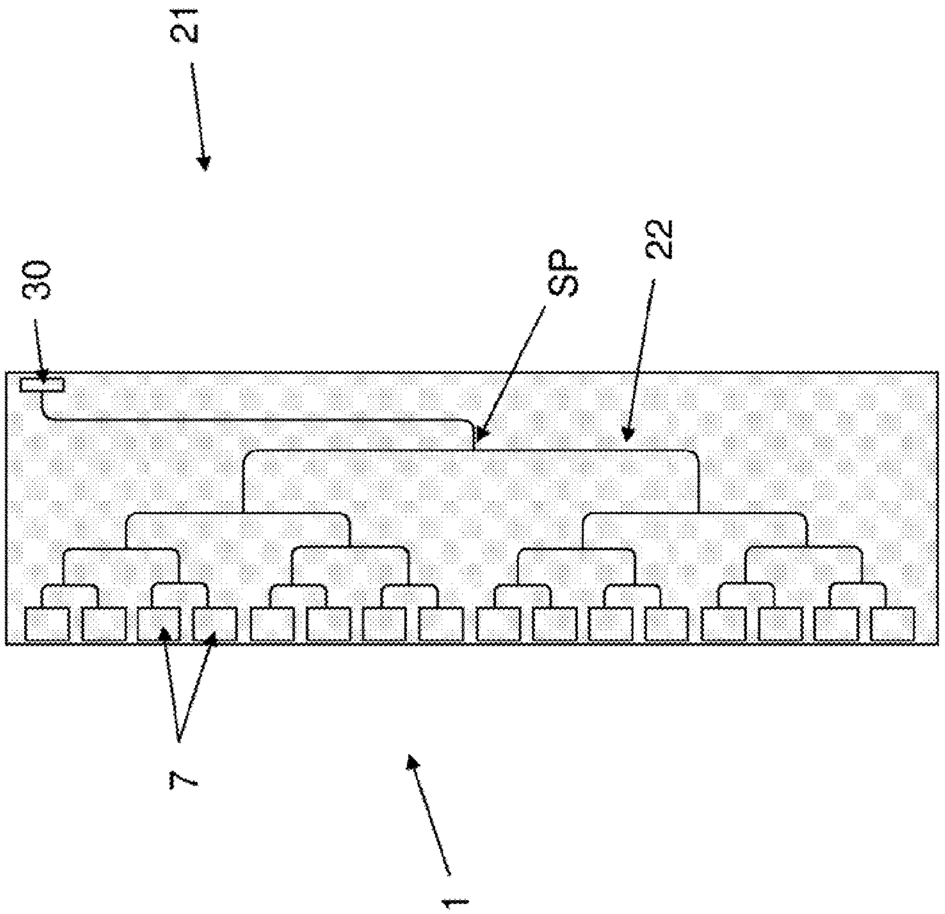
FIG. 4 schematically shows a side view of a waveguide board according to the invention.

FIG. 4 schematically shows a side view of a waveguide board 21 according to the invention. Each antenna device 14 comprises at least one waveguide board 21 and each of the waveguide boards 21 are fed microwave power independently of the others in order to allow the antenna system 1 to be phase-steered.

Each waveguide board 21 comprises second waveguides 22 that distribute vertically Z the power to/from typically one or two summation points to a number of, typically 10-20, second antenna elements 7. FIG. 4 shows an example of a waveguide board 21 with one summation point SP. The planar waveguide board 21 can be realized in different techniques, where a suspended stripline is a beneficial choice because of its low losses. The waveguide board 21 comprises at least one connector 30 for wave guide transition from, for example, the above described assembly of first waveguides 6 or from third waveguides (see FIG. 7) to the second waveguides 22. The third waveguides 29 connects the waveguide board 21 to the distribution system (3 in FIGS. 1-3). As been stated above, the distribution system 3 advantageously comprises the assembly of first waveguides 6, but may comprise an alternative microwave feeding device, for example a flexible cable or the like. This is of course a completely different solution where the advantages of using the waveguides 6 are lost.

Because of the lack of a ground plane, the antenna elements should possess an inherent directivity. There are several known types of elements that fulfill this requirement. The below described FIGS. 5*a*, 5*b* and 6 all show different embodiments for an antenna device according to the invention where the ground plane has been established in three different ways. In all embodiments shown in FIGS. 5*a*, 5*b*, 6, the waveguide board 21 is positioned within a housing 23 comprising a foam-like material 24.

Figure 5A:
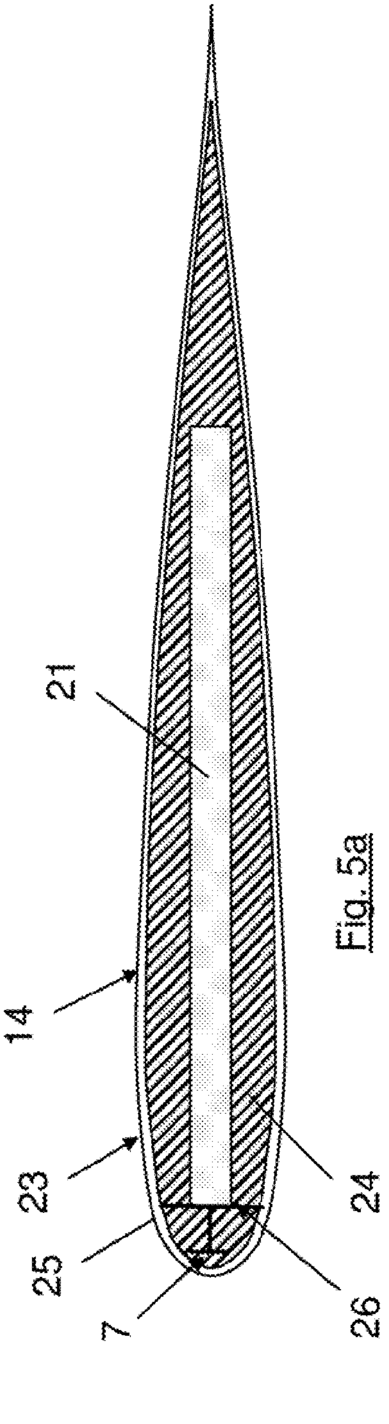
FIG. 5*a* schematically shows an antenna device according to a first embodiment of the invention.

FIG. 5*a* schematically shows antenna device 14 according to a first embodiment of the invention. In FIG. 5*a* the antenna device comprises a ground plane 26 comprised within the housing 23 adjacent the waveguide board 21 and coupled to the second waveguides (22, FIG. 4). The second antenna element 7 is comprised within the housing 23 and protrudes from the ground plane 26 in the longitudinal direction X for directivity purpose.

Figure 5B:
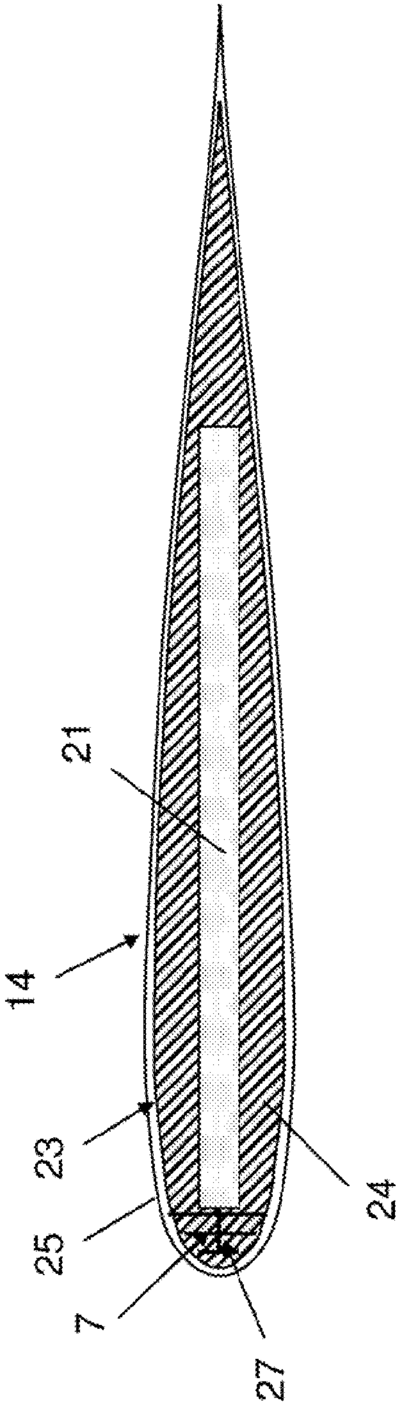
FIG. 5*b* schematically shows an antenna device according to a second embodiment of the invention.

FIG. 5*b* schematically shows an antenna device 14 according to a second embodiment of the invention. In FIG. 5*b* the antenna devices 14 are similar to the antenna devices according to FIG. 5*b*, but with the exception that the second antenna element is a passive or active structure for directivity purpose.

Figure 6:
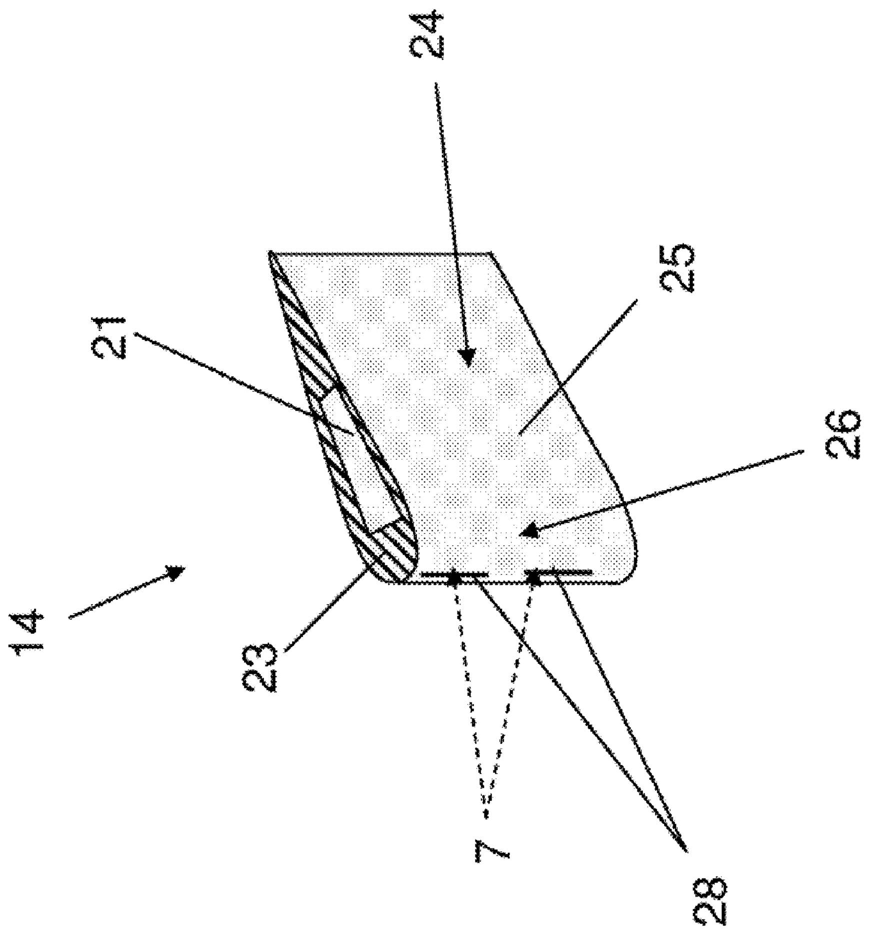
FIG. 6 schematically shows a cross-section of an antenna device according to a third embodiment of the invention.

FIG. 6 schematically shows a cross-section of an antenna device 14 according to a third embodiment of the invention. Only a part of the antenna device 14 is shown in FIG. 6. In FIG. 6 the housing comprises a surface layer 25 encasing the foam-like material 24 for increased form stability. The surface layer 25 may comprise a metallic skin providing a ground plane 26 for achieving an enhanced directivity. The surface layer 25 comprises slots 28 in the height direction Z, i.e. in the vertical direction, in connection to the second antenna elements 7.

In FIG. 6 the planar waveguide board 21 feeds the vertical slots 28 in the conductive surface layer 25 via the second antenna element 7. The metallic skin provides the ground plane needed for achieving an enhanced directivity.

Figure 7B:
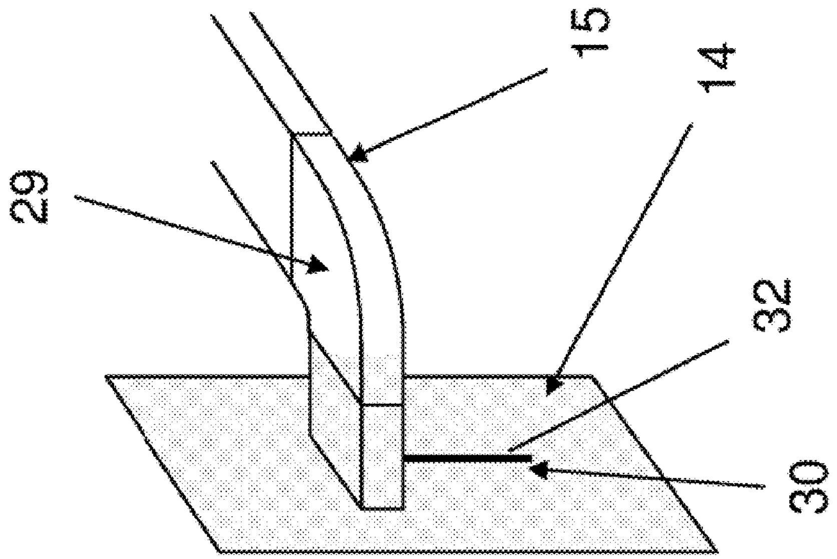
FIGS. 7*a* and 7*b* schematically show a connector for the waveguide board according to the invention.
Figure 7A:
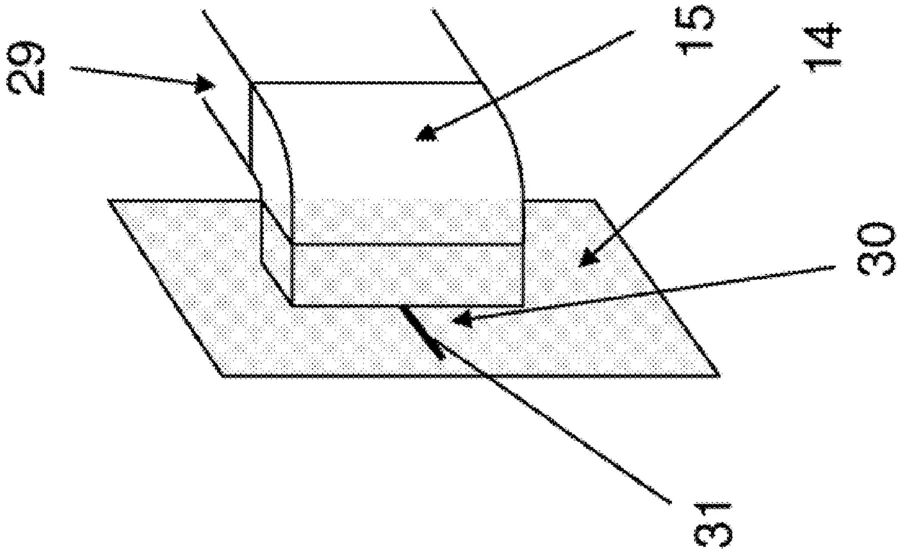

FIGS. 7*a* and 7*b* schematically show third waveguides 29 in a support structure 15 according to the invention. In FIG. 7 the support structure 15 is coupled to the antenna devices 14 for keeping the antenna devices 8 in position relative the dorsal unit (not shown in FIGS. 7*a* and 7*b*). The third waveguides 29 are arranged for feeding microwave power to the waveguide boards 21 via the connector 30.

FIG. 7*a* shows a segment of the third waveguide 29 coupled to the antenna device 14. In FIG. 7*a* the third waveguide 29 has a rectangular cross-section and is arranged for feeding a horizontally polarized signal. In FIG. 7*a* the connector 30 comprises a horizontally oriented slot 31 for receiving the signal being fed to the connector by the third waveguide 29. In the area where the third waveguide 29 meets the connector 30, the third waveguide has a vertical extension. The horizontal slot 31 is thus arranged essentially perpendicular to the extension of the third waveguide 29.

FIG. 7*b* shows a segment of the third waveguide 29 coupled to the antenna device 14. In FIG. 7*b* the third waveguide has a rectangular cross-section and is arranged for feeding a vertically polarized signal. In FIG. 7*b* the connector 30 comprises a vertically oriented slot 32 for receiving the signal being fed to the connector by the third waveguide. In the area where the third waveguide 29 meets the connector 30, the third waveguide has a horizontal extension. The vertical slot 32 is thus arranged essentially perpendicular to the extension of the third waveguide 29.

In another embodiment the third waveguides 29 in FIGS. 7*a* and 7*b* may be the first waveguides 6. The arrangement in FIGS. 7*a* and 7*b* may thus be applied on an arrangement where the third waveguides are replaced by the first waveguides. In all embodiments it is possible to use extra support structures.

Figure 8B:
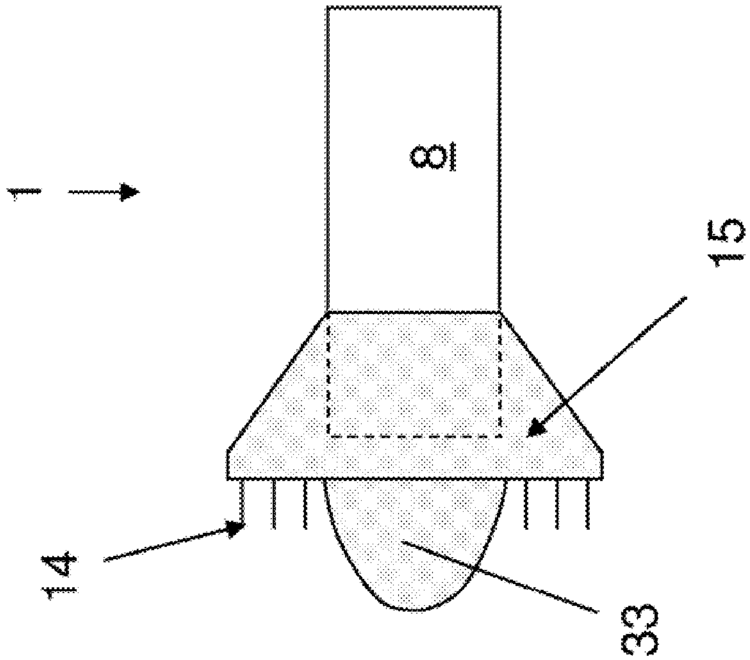
FIG. 8*b* schematically shows a top view of an antenna system according to FIG. 8*a*.
Figure 8A:
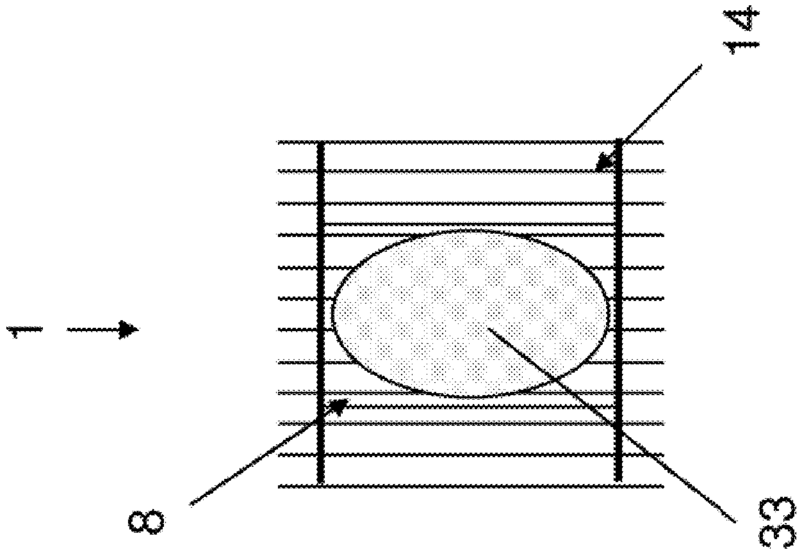

FIG. 8*a* schematically shows a front view of an antenna system according to the invention comprising a radome 33. In order to reduce aerodynamic drag, the dorsal unit 8 may be partly covered with a radome 33 for covering the front projection of the dorsal unit 8. Since the antenna devices 14 may have a larger vertical extension than that of the dorsal unit 8, the antenna devices 14 that are in fore and/or in the aft of the dorsal unit 8 may protrude out from the radome 33.

FIG. 8*b* schematically shows a top view of an antenna system according to FIG. 8*a*. Tight separation of the feed waveguides may make it difficult to bend them onto the planar waveguide boards 21. However, a realization may be facilitated by (i) separating the antenna/waveguide boards to the grating lobe limit imposed by +/−30 degree scannability, (ii) realizing the feeding second waveguides 22 as narrow and ridged waveguides. Space is then made free for curving the second waveguides onto the boards. The support structure 15 therefore widens towards the antenna devices 14, as seen in FIG. 8*b*, in order to house the spreading second waveguides 22.

The invention claimed is:

1. An antenna system for an airborne radar system, the antenna system comprising:

a dorsal unit having two opposing long sides extending in a height direction (Z) and a longitudinal direction (X) and two opposing short sides extending in a lateral direction (Y) and the height direction (Z), and an upper side opposing a bottom side each extending in the longitudinal direction (X) and the lateral direction (Y), wherein the antenna system further comprises a plurality of first antenna elements interspaced and mounted in connection to one or both of the short sides and extending in the height direction (Z), wherein each of the first antenna elements further comprises a waveguide board.

2. The antenna system according to claim 1, wherein the waveguide board further comprises second antenna elements.

3. The antenna system according to claim 2, wherein each waveguide board comprises second waveguides arranged to distribute the power to/from at least one summation point to the second antenna elements.

4. The antenna system according to claim 3, wherein each of the waveguide boards are arranged to be fed microwave energy independently of the other waveguide boards for control of phases and amplitudes between different antenna elements.

5. The antenna system according to claim 2, further comprising a microwave power distribution system having a number of first transmit/receive (T/R) units being coupled to the first antenna elements for distribution of microwave power to the first antenna elements, wherein the microwave power distribution system is coupled to the second antenna elements.

6. The antenna system according to claim 5, wherein the microwave power distribution system further comprises an assembly of first waveguides coupled to the second antenna elements being directed at an angle essentially perpendicular to the first antenna elements, wherein the first T/R units are coupled to the first waveguides for distribution of microwave energy to the second antenna elements.

7. The antenna system according to claim 5, wherein the assembly of first waveguides are mounted on the upper side and/or on the bottom side of the dorsal unit and/or inside the dorsal unit.

8. The antenna system according to claim 5, wherein the first antenna elements are positioned at least longitudinally (X) on each of the long sides of the dorsal unit and that the second antenna elements are positioned in connection to one or both of the short sides.

9. The antenna system according to claim 5, wherein the antenna devices are connected to the first waveguides so that the microwave power supplied by the first T/R units can be distributed by the antenna system such that an azimuthal scan is performed by the radar system in a direction out from one or both of the short sides, in the forward direction and/or the rearward direction of an airplane when the dorsal unit is mounted onto an airplane.

10. The antenna system according to claim 5, wherein the second antenna elements are connected to second T/R units being arranged to be controlled such that the microwave power supplied by the first T/R units can be distributed by the antenna system such that an elevation scan is performed by the radar system in a direction out from one or both of the short sides in the forward direction and/or the aft direction of an airplane when the dorsal unit is mounted onto the airplane.

11. The antenna system according to claim 5, wherein the first antenna elements are connected to the first T/R units so that the microwave power supplied by the first T/R units can be distributed by the antenna system in such a way that an azimuthal scan is performed by the radar system in a direction out from one or both of the long sides in the lateral direction (Y) of an airplane when the dorsal unit is mounted onto the airplane.

12. The antenna system according to claim 5, further comprising a control device for controlling the first T/R units and thereby the phase shifts of the microwave power between the first antenna elements and the second antenna elements.

13. The antenna system according to claim 12, wherein the first antenna elements are positioned essentially parallel to the second antenna elements.

14. The antenna system according to claim 12, wherein the second antenna elements are positioned in series in the height direction.

15. The antenna system according to claim 1, wherein each waveguide board is comprised within an aerodynamic housing.

16. The antenna system according to claim 15, wherein the housing comprises a foam-like material surrounding the waveguide board.

17. The antenna system according to claim 16, wherein the housing comprises a surface layer encasing the foam-like material.

18. The antenna system according to claim 17, wherein the surface layer is a metallic skin providing a ground plane for achieving an enhanced directivity, wherein the surface layer comprises slots in the height direction (Z).

19. The antenna system according to claim 15 wherein the antenna device comprises a ground plane within the housing adjacent the waveguide board and coupled to the second waveguides, wherein the second antenna elements are within the housing and protruding from the ground plane in the longitudinal direction (X) for directivity purposes.

20. The antenna system according to claim 1, wherein the second antenna elements comprise a passive or active structure for directivity purposes.

21. The antenna system according to claim 1, wherein the antenna system comprises a support structure comprising third waveguides for feeding microwave power to the waveguide boards via connectors.

22. The antenna system according to claim 21, wherein the connector is vertically oriented or horizontally oriented.

23. The antenna system according to claim 1, wherein the antenna elements are separated so that a grating lobe limit is imposed by a prescribed, limited scannability.

24. The antenna system according to claim 1, wherein each waveguide board is planar.

* * * * *

UNITED STATES PATENT AND TRADEMARK OFFICE

CERTIFICATE OF CORRECTION

PATENT NO. : 8,094,062 B2
APPLICATION NO. : 12/517423
DATED : January 10, 2012
INVENTOR(S) : Hook It is certified that error appears in the above-identified patent and that said Letters Patent is hereby corrected as shown below:

In Column 2, Line 9, delete “system arranged” and insert -- system is arranged --, therefor.

In Column 3, Line 19, delete “PR-units” and insert -- T/R-units --, therefor.

In Column 5, Line 59, delete “first,” and insert -- first --, therefor.

In Column 8, Line 62, delete “PR-units” and insert -- T/R-units --, therefor.

In Column 9, Line 30, delete “4” and insert -- 14 --, therefor.

Signed and Sealed this
Tenth Day of April, 2012

David J. Kappos
*Director of the United States Patent and Trademark Office*